United States Patent [19]

Hansen et al.

[11] 4,103,607
[45] Aug. 1, 1978

[54] PITTING DEVICE FOR DRUPACEOUS FRUIT

[75] Inventors: Clarence M. Hansen, East Lansing; John P. Harvey, Grand Haven; Richard L. Ledebuhr, Haslett, all of Mich.

[73] Assignee: Dura Corporation, Southfield, Mich.

[21] Appl. No.: 718,467

[22] Filed: Aug. 30, 1976

[51] Int. Cl.² ............ A23N 4/06; A23N 3/04; A47J 23/00
[52] U.S. Cl. .................... 99/548; 99/561; 198/626
[58] Field of Search ............ 99/548, 559–561, 99/565; 198/626, 620, 627–628; 426/484–485

[56] References Cited

U.S. PATENT DOCUMENTS

| 1,822,381 | 9/1931 | Smith | 99/561 |
|---|---|---|---|
| 3,454,064 | 7/1969 | Weber | 99/561 |
| 3,869,038 | 3/1975 | Piper | 198/626 |

Primary Examiner—Harvey C. Hornsby
Assistant Examiner—Robert Pous
Attorney, Agent, or Firm—Hill, Gross, Simpson, Van Santen, Steadman, Chiara & Simpson

[57] ABSTRACT

An inner portion of a conveyor comprising a plurality of pivotably joined crossbars having an open bottom receiving cup to hold a piece of drupaceous fruit is driven at a synchronized speed below a fruit feeder device. After the feeder device deposits a piece of fruit in each cup, the inner conveyor portion travels a short distance where it is joined by an outer portion of the conveyor comprising a like plurality of pivotably joined crossbars having an inverted covering cup with a perforated diaphragm top. The conveyor portions mate to partially enclose the piece of fruit within the cups. The fruit is conveyed through a pitting station where a star-shaped pitting tool is driven at high speed through the opening in the bottom of the receiving cup, into the piece of fruit to contact a pit of the fruit and push the pit upward through the perforation of the diaphragm in the covering cup. As the tool is withdrawn from the fruit, the fruit and its now separated pit are conveyed separately for further processing.

2 Claims, 7 Drawing Figures

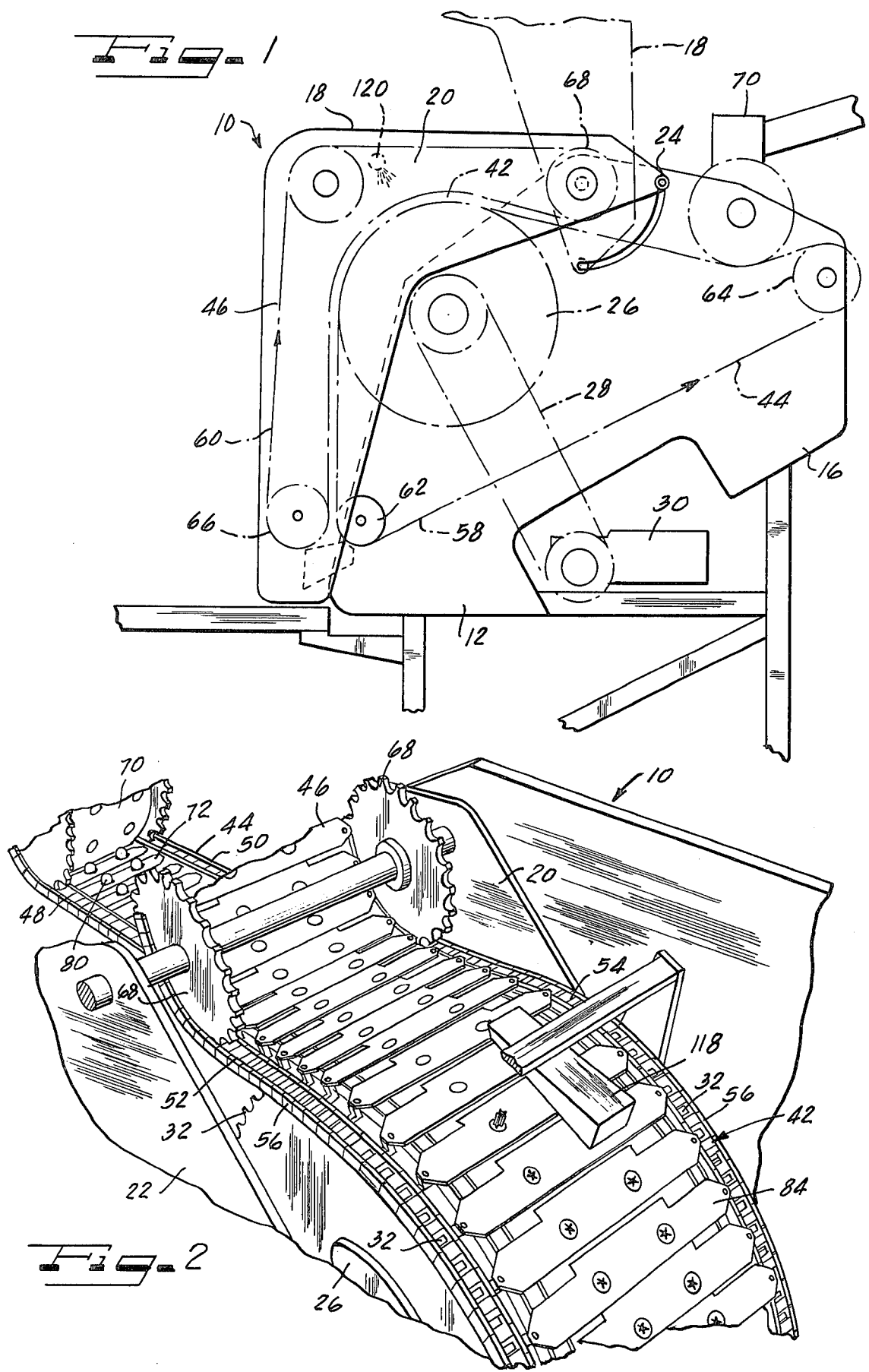

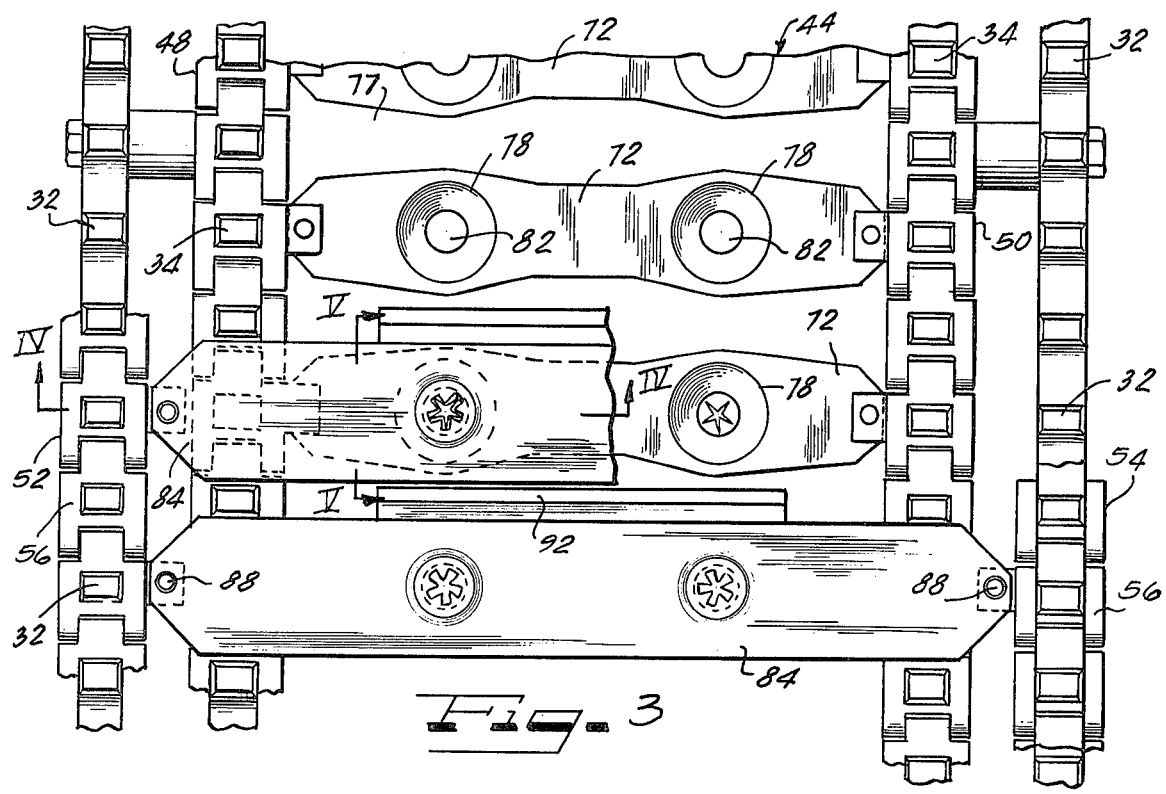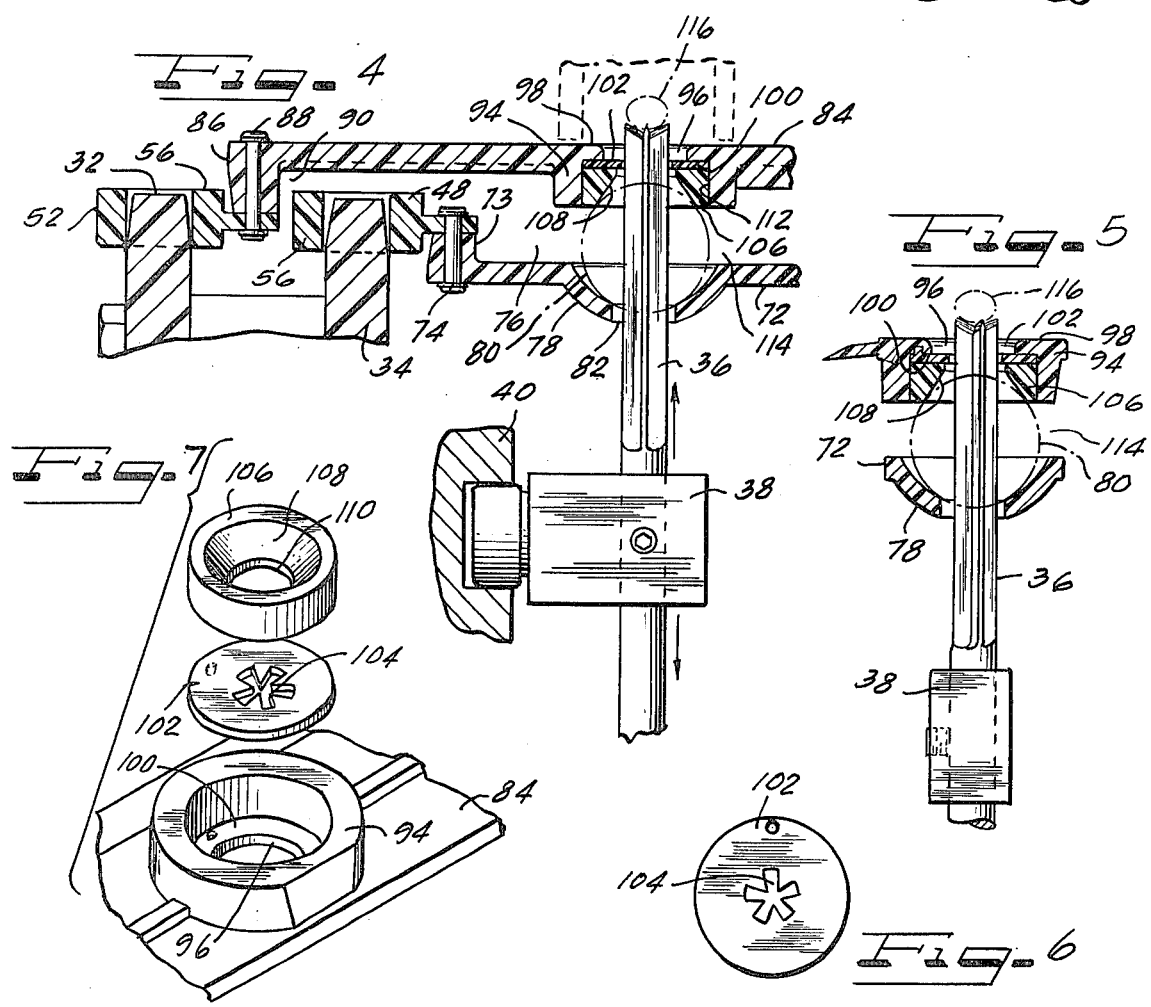

PITTING DEVICE FOR DRUPACEOUS FRUIT

BACKGROUND OF INVENTION

1. Field of Invention

This invention relates to processing equipment for use with drupaceous type fruit and particularly to means for pitting such fruit.

2. Description of Prior Art

Devices to remove pits from fruit have long been available and known in the art for many years. These devices operate at relatively slow speeds and at relatively low efficiency since, first, such devices as presently available cannot pit overripe fruit, secondly, the fruit which is processed by the machines remains with a certain percentage of pits still present, and thirdly, during the pitting operation, a certain percentage of the meat of the fruit is removed along with the pit.

To obtain 100 pounds of pitted cherries using devices presently available required 125 pounds of cherries containing typically 13 pounds of pits. During pitting, an additional 12 pounds of fruit was removed along with the 13 pounds of pits.

The efficiency of removing pits is demonstrated by the presently existing U.S. Agricultural Department standards for U.S. Grade A or U.S. Grade Fancy for cherries which allows one pit per 40 ounces of processed fruit. In practical terms, if a pound of processed cherries is used in a typical cherry pie, each third pie theoretically contains a hidden pit to be encountered by an unwary consumer.

One example of such a device presently in use for pitting cherries includes a rotating drum having an outer surface covered with rows of recessed cups which receive a flow of fruit from a conveyor located above the drum. A worker standing over the drum distributes fruit onto the top surface of the drum and hopefully into those cups in the row having a vertical orientation. As the drum rotates, the fruit is moved to a pitting station where a needle-like plunger is driven into the cup which may or may not contain a piece of fruit. As the drum continues to rotate, the row in which the pitted fruit is located eventually reaches a bottom vertical or inverted position where the contents of the cup will normally be removed by gravity. As the drum rotates upward to a top vertical position, the cup is again filled with fruit for further processing.

Other pitting devices include means for retaining a piece of fruit, moving such to a pitting station, and then removing the fruit after pitting, as disclosed in U.S. Pat. No. 2,360,412, U.S. Pat. No. 2,248,818, and U.S. Pat. No. 3,162,223.

SUMMARY OF INVENTION

A flow of drupaceous fruit is first processed by a sizer-eliminator which removes particularly overripe pieces of fruit, undersized pieces of fruit and any foreign material in the flow. The structure of the sizer-eliminator has been disclosed in a concurrently filed patent application.

From the sizer-eliminator fruit passes into a separating and feeding mechanism which can deposit individual pieces of fruit into the conveying means as disclosed by this invention. Such a method and apparatus for feeding fruit onto a moving conveyor is revealed in U.S. Patent Application Ser. No. 555,003, now U.S. Pat. No. 3,927,462.

This invention includes a plurality of crossbars which are intermittently and transversely spaced between two longitudinal chains to form an inner conveyor portion which is fed over a drive sprocket carried by a drive wheel and several idling sprockets to form a continuous loop. Each crossbar of the inner conveyor portion is offset inwardly. Within each crossbar of the inner conveyor portion are two spaced semi-spherical fruit receiving cups, each cup having an aperture through its bottom.

An outer conveyor portion is formed having a like plurality of crossbars transversely spaced between two longitudinal chains which are fed over a like pair of drive sprockets carried by the drive wheel and several idling sprockets to form an outer continuous loop. Each crossbar of the outer conveyor portion is offset outwardly. The outer crossbar contains an inwardly protruding cup having an aperture through its top covered by a resilient diaphragm having a perforation therein.

During operation, the inner conveyor portion is driven below the feeder device noted earlier which deposits a piece of fruit within the fruit receiving cup. Downstream from the feeder device the outer conveyor portion joins with the inside portion at a synchronized speed and location so that the two cups mate to form a fruit retaining closure about the deposited piece of fruit.

Immediately downstream from the mating of the outer and inner portions of the conveyor the piece of fruit enters a pitting station where a star-shaped needle carried by the drive wheel is driven at high speed through the opening in the bottom cup, through the piece of fruit to lift an enclosed pit through the perforation in the diaphragm. As the needle is withdrawn, the pit remains separated from the fruit by the diaphragm where it can be removed by a pit collection device.

The pitted fruit is conveyed to a convenient location where the inner and outer portions of the conveyor separate to allow the fruit to be deposited and further processed as required. The inner conveyor portion goes around a minimum sized sprocket to increase the centrifugal force needed to assure the truest separation trajectory possible.

The apparatus as disclosed by this invention produces several startling results which heretofore have not been available. First, this device can pit much riper fruit than other devices heretofore available. By being able to process soft, end of the season, fruit, the processor as well as the fruit grower gains an additional monetary advantage.

A second surprising result is the fact that the pitter produces virtually 100 percent pit-free fruit.

A third result not heretofore achieved is that the amount of fruit removed during pitting is reduced to a negligible amount. By reducing this waste during pitting, the processor gains up to 12 percent more saleable fruit.

A further surprising result from the device as disclosed by this invention is that the output of the invention is equal to 800 pounds of pitted cherries per hour from each channel or longitudinal grouping of cups. Since the conveyor includes two sets of cups, it is considered a two-channel machine having a total equivalent output of 1600 pounds of cherries per hour. In practice, a two channel device has pitted in excess of 2000 pounds per hour. The actual output will vary with the size of the fruit.

Additionally, because the pit is separated upwardly and outwardly, the device is simplified and its power consumption dramatically reduced.

BRIEF DESCRIPTION OF THE DRAWINGS

FIG. 1 is a schematic view of the inner and outer portions of the conveyor forming their respective loops.

FIG. 2 is a perspective cutaway of the inner and outer portions of the conveyor including the feeding mechanism, the mating of the conveyor portions and the pitting station.

FIG. 3 is a plan view of the inner and outer conveyor portions with a cutaway to disclose each portion.

FIG. 4 is a cross-sectional view of the inner and outer portions of the conveyor with the pitting needle reciprocated through the fruit retaining cups as viewed along the line IV—IV.

FIG. 5 is a cross-sectional view along the line V—V of FIG. 3.

FIG. 6 is a plan view of the perforated diaphragm carried in the covering cup of the outer conveyor portion.

FIG. 7 is an exploded assembly view of the diaphragm as enclosed within the fruit covering cup.

DESCRIPTION OF THE PREFERRED EMBODIMENT

A pitter for pitting drupaceous fruit is shown generally at 10 and includes a base 12 comprising two spaced uprights 14 and 16. An outer support portion 18, formed from two generally L-shaped spaced frame members 20 and 22, is pivotably joined to the base 12 at a pivot 24.

The upper support portion 18 can be easily rotated upward to allow ready access to a drive wheel 26 pivotably carried between the uprights 14 and 16 and operatively connected by a chain 28 to a drive motor 30.

The drive wheel 26 comprises a pair of outer conveyor portion drive sprockets 32 and an inner conveyor portion drive sprocket 34. Between the pairs of drive sprockets 32 and 34 is a plurality of radially disposed star-shaped pitting tools 36 which are supported respectively in a tool holder 38 slidably carried by a tool holder guide 40. The tool holder 38 engages a suitable cam to cause reciprocation as the drive wheel 26 rotates.

The pitter 10 further includes a conveyor 42 formed of an inner portion 44 and an an outer portion 46. The inner and outer conveyor portions 44 and 46 comprise a right and left chain 48, 50, 52 and 54 respectively. The chains 48–54 are formed from a plurality of links 56 which are pivotably joined to form an inner conveyor portion closed loop 58 and outer conveyor portion closed loop 60.

The inner conveyor portion 44 is supported by a first pair and a second pair of idle sprockets 62 and 64 pivotably carried between the base uprights 14 and 16 and is driven by the pair of inner conveyor portion drive sprockets 34 carried by the drive wheel 26.

The closed loop 60 of the outer conveyor portion 46 has a generally L-shaped configuration and is supported by a first pair and a second pair of idle sprockets 66 and 68 pivotably carried between frame members 20 and 22 of the outer support portion 18. The chains 52 and 54 of the outer conveyor portion 46 interface with the pair of outer conveyor portion drive sprockets 32 carried by the drive wheel 26. Because the pairs of drive sprockets 32 and 34 are an integral part of the drive wheel 26 and have the same diameter, the inner conveyor portion 44 and the outer conveyor portion 46 of the conveyor 42 travel at the identical velocity and maintain a constant relatively longitudinal relationship.

The chains 48 and 50 of the inner conveyor portion 44 also interfaces with an article feeding device 70 which is located upstream from the first pair of outer idle sprockets 68.

Between the chains 48 and 50 of the inner conveyor portion 44 is a plurality of transversely positioned elongated crossbars 72 having at each end thereof an outwardly protruding leg 73 which is pivotably joined to each second link 56 by a pin 74. The longitudinal distance between adjacent center lines of crossbars 72 is identical to the spacing between adjacent center lines of crossbars 72 is identical to the spacing between the pitting tools 36. Because of the legs 73, an offset 76 is formed. Likewise, because the crossbar 72 is fastened to every second link 56 of the inner chain 48 and 50, a space 77 is formed between adjacent crossbars 72.

The inner crossbar 72 has two integrally formed inwardly protruding semi-spherical spaced fruit receiving cups 78 having a depth equal to approximately one-third the diameter of a piece of fruit 80. The diameter of the cup 78 is selected to be slightly greater than the normal diameter of the type of fruit to be processed. Each cup 78 in the crossbar 72 is formed having an aperture 82 therein to align with the vertical axis of the cup 78 as viewed in FIG. 4 and dimensioned to provide sufficient clearance to allow the reciprocation of the pitting tool 36 carried by drive wheel 26.

The outer conveyor portion 46 is formed having a like plurality of transversely positioned elongated crossbars 84 having at each end thereof inwardly protruding leg 86 which is pivotably joined to each second link 56 by a pin 88. Because of the leg 86, an offset 90 is formed. Because of the offset 76 and the offset 90 of the crossbars 70 and 84, the inner conveyor drive sprockets 34 and the outer conveyor portion drive sprockets 32 have the same pitch diameter. Likewise, because the crossbar 84 is fastened to every second link 56 of the chains 52 and 54, a like space 92 is formed below adjacent crossbar 84.

Each crossbar 84 has two integrally formed inwardly protruding cylindrically shaped spaced fruit covering cups 94. The cups 94 have an aperture 96 in a top 98 of the cup 94 having a lesser diameter than the cup 94 to form a shoulder 100.

Into the cup 94 is inserted a resilient diaphragm 102 having a five pointed star-shaped perforation 104. A cup insert 106 having a cylindrical outer surface and semi-spherical shaped inner surface 108 which converges to a top circular opening 110 having a diameter slightly larger than the diameter of the perforation 104 is cemented into the cup 94 by use of a suitable mastic to form a permanent joint 112 to hold the diaphragm 102 against the shoulder 100 of the cup 94.

During operation, individual pieces of fruit 80 are deposited in the fruit receiving cup 78 of the inner crossbar 72 by the article feeder 70 as the inner conveyor portion 44 passes below the article feeder 70. Since the feeder 70 is driven by the chains 48 and 50 of the inner conveyor portion 44, the moment of release of the fruit 80 is synchronized to the relative position of the fruit receiving cup 78.

As the inner conveyor portion 44 travels away from the feeder-depositor 70, the outer conveyor portion 46 mates with inner portion 44 to form a fruit closure 114 about the piece of fruit 80.

With the piece of fruit 80 within the fruit closure 114, the conveyor 42 travels to a point of contact with the drive wheel 26. The pitting tool 36 carried by the rotating drive wheel 26 is driven upward and through the apertures 82 in the fruit holding cup 78 and into the piece of fruit 80, engages a pit 116 within the piece of fruit 80 and pushes the pit 116 through the perforation 104 in the diaphragm 102. As the pitting tool 36 is withdrawn, the pit 116 is retained in a pit collector 118 for subsequent removal while the now pitted piece of fruit 80 continues its travel within the fruit closure 114 formed by the mating of inner and outer conveyor portions 44 and 46.

To aid in the lubrication and provide continuous cleaning of the moving parts and promote subsequent separation of the piece of fruit 80 from the fruit closure 114 and the pit 116 from within the pit collector 118, a spray of water 120 is directed on the piece of fruit during pitting.

While various modifications may be suggested by those versed in the art, it should be appreciated that we wish to embody within the scope of the patent warranted herein, all such modifications as reasonably and properly come within the scope of our contribution to the art.

I claim as my invention:

1. A high speed drupaceous fruit pitting apparatus comprising,
   support means having a base comprising two spaced uprights and an outer support portion further comprising two spaced L-shaped frame members pivotably carried by said base to allow separation of said outer portion from said uprights,
   a single drive wheel pivotably carried between said uprights of said base and including a pair of inner conveyor drive sprockets and a pair of outer conveyor drive sprockets, said pairs of sprockets having proximately equal diameters respectively,
   an inner conveying means carried by said base portion to form a closed loop therein and including a pair of spaced chains interfacing with said pair of inner conveyor drive sprockets, a plurality of transversely positioned offset crossbars carried between said chains, an outward protruding fruit receiving cup on said crossbar, said cup having an aperture in a bottom thereof,
   an outer conveying means carried by said outer support portion of said support means to form a closed L-shaped loop therein and including a pair of spaced chains interfacing with said pair of outer conveyor drive sprockets, a plurality of transversely positioned offset crossbars carried between said chains and an inwardly protruding fruit covering cup on said crossbar, said cup having a perforated diaphragm covered aperture in a top thereof, said inner and outer conveying means mating to form a fruit closure means between adjacent receiving and covering cups on said crossbars for a selective portion of said closed loops respectively,
   pitting means carried by said drive wheel between said pairs of said drive sprockets, and
   drive means including cam means carried on said support means to rotate said drive wheel continuously and cause said pitting means to reciprocate in and out of said aperture in said receiving and covering cups in a synchronized manner as said inner and outer conveyor portions are driven by said drive wheel over said pairs of drive sprockets,
   wherein said pitting means reciprocates through said fruit closure means to remove a pit of a piece of fruit within said closure and said outer support portion can be readily rotated upward to provide access to said pitting and drive means as required.

2. Conveying and pitting apparatus for continuous, high volume processing of pieces of drupaceous fruit comprising,
   apparatus body having two spaced uprights and an L-shaped outer support portion rotatively carried by said uprights to allow said outer portion to be swung upward and away from said uprights and provide separation therebetween,
   a drive wheel rotatively carried between said uprights and having a pair of spaced inner conveyor portion drive sprockets and a pair of spaced outer conveyor portion drive sprockets, said pairs having a proximately equal diameter,
   a continuous, triangular-shaped inner conveyor portion having one substantially vertical leg and one substantially horizontal leg and further comprising,
   a pair of spaced chains positioned to engage said inner conveyor portion drive sprockets at a junction of said horizontal and said vertical legs, a first pair of idle sprockets positioned at an outer end of said horizontal leg, and second pair of idle sprockets positioned at a bottom of said vertical leg,
   a plurality of crossbars carried between alternate links of said spaced chains, said crossbar having legs carried one each at ends of said crossbars and pivotably joined to said links to form an inner offset, and
   a plurality of fruit receiving cups carried on an outer surface of said crossbar, said cups having a semi-spherical inner surface and an aperture through said cup,
   a continuous L-shaped outer conveyor portion having a first pair of substantially horizontal legs and second pair of substantially vertical legs and further comprising,
   a pair of spaced chains positioned to engage said outer conveyor portion drive sprockets at a junction of said vertical and horizontal legs, a first pair of idle sprockets positioned at an outer end of said pairs of horizontal legs and above said horizontal leg of said inner conveyor portion of a proximate midpoint thereof, and a second pair of idle sprockets positioned at a bottom of said pairs of said vertical legs and aligning with said second pair of idle sprockets of said inner conveyor portion,
   a plurality of crossbars carried between alternate links of said spaced chains, said crossbar having legs carried one each at ends of said crossbars and pivotably joined to said links to form an outer offset, and
   a plurality of fruit covering cups carried on an inner surface of said crossbar having a semi-spherical-shaped inner surface and a flat resilient perforated diaphragm in part covering an aperture through said cup, said cups positioned to align and mate with said cups of said inner conveyor portion to form a fruit closure,
   fruit depositing means to feed articles of fruit into said fruit receiving cups of said inner conveyor portion, said means positioned between said ends of said horizontal legs of said inner and outer conveyor portions, said pair of spaced chains of said inner conveyor portion engaging said depositing means and driving such at a synchronized speed, cam means carried on said apparatus body pitting means carried by said drive wheel between said pairs of sprockets and actuable by said cam means to selectively reciprocate into said aperture in said cups of said inner and outer conveyor portions as said spaced chains of said inner and outer conveyor portions engage with said pairs of drive sprockets respectively, wherein pitting can be accomplished continuously in that there is no relative longitudinal motion between said pitting means and said fruit closure.

* * * * *